United States Patent [19]
Schroeter

[11] 3,893,779
[45] July 8, 1975

[54] HUB-TO-SHAFT CONNECTION

[75] Inventor: Joachim W. Schroeter, North Tonawanda, N.Y.

[73] Assignee: Buffalo Forge Company, Buffalo, N.Y.

[22] Filed: May 13, 1974

[21] Appl. No.: 469,368

[52] U.S. Cl. .............................. 403/370; 403/356
[51] Int. Cl. .............................................. F16d 1/06
[58] Field of Search ........... 403/370, 356, 358, 355, 403/371

[56] References Cited
UNITED STATES PATENTS
3,257,070   6/1966   Kuklinski ........................ 403/370
FOREIGN PATENTS OR APPLICATIONS
135,438   11/1902   Germany ........................ 403/356

Primary Examiner—Andrew V. Kundrat
Attorney, Agent, or Firm—Joseph P. Gastel

[57] ABSTRACT

A hub-to-shaft connection comprising a shaft, a hub, key means positioned directly between said hub and said shaft, first and second spaced tapered surfaces on the inside of said hub, first and second spaced collars each having a plurality of circumferentially spaced flexible tapered leaves in engagement with the first and second tapered surfaces, respectively, and screw means extending through said collars and received in said hub for moving said tapered flexible leaves into tight wedging engagement between said tapered surfaces of said hub and the outer surface of said shaft.

1 Claim, 6 Drawing Figures

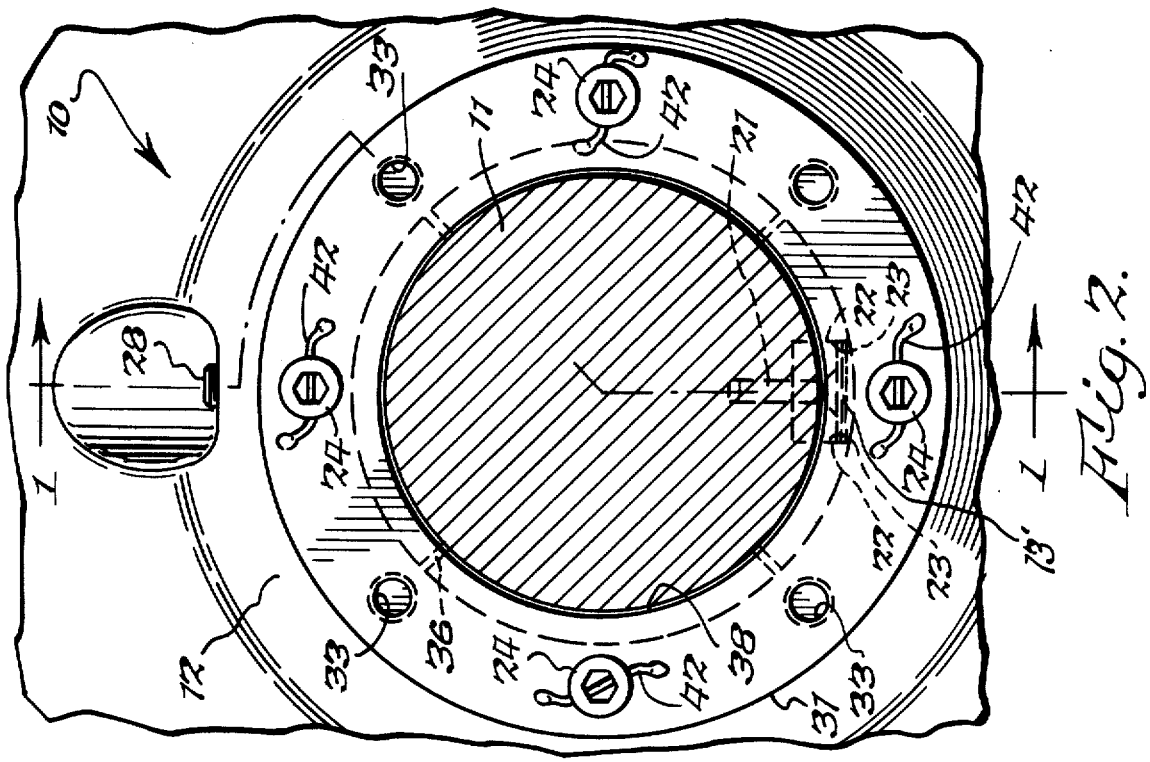
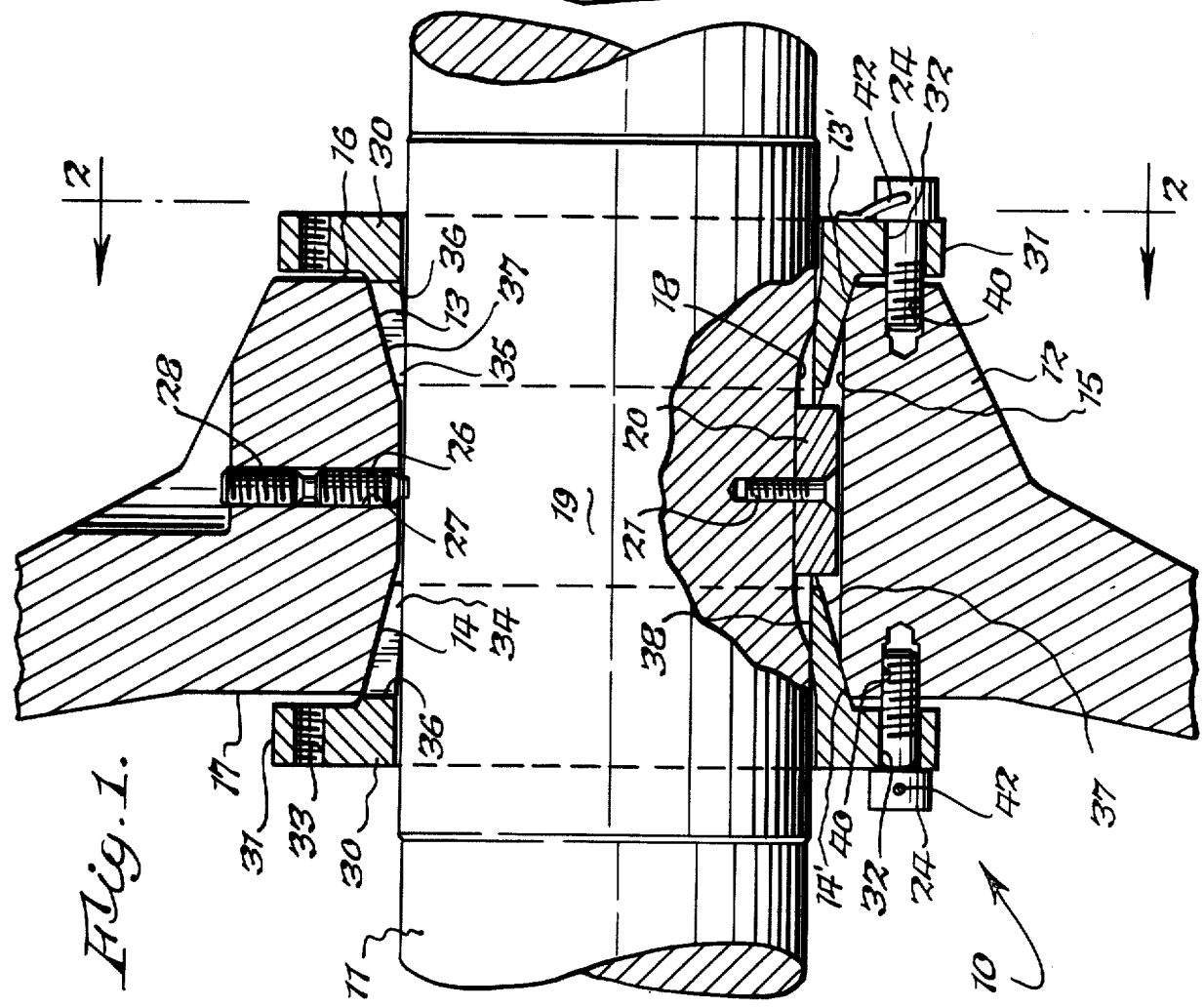

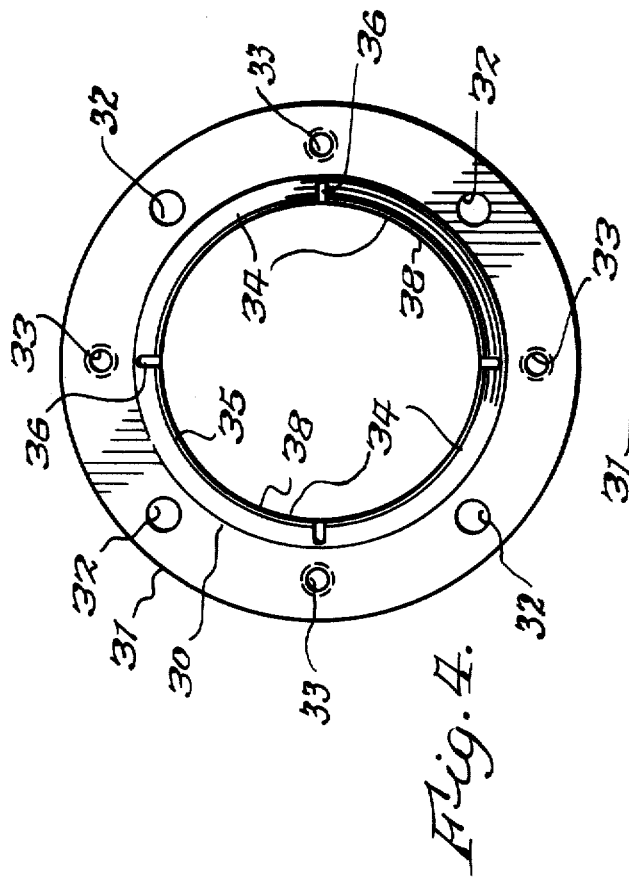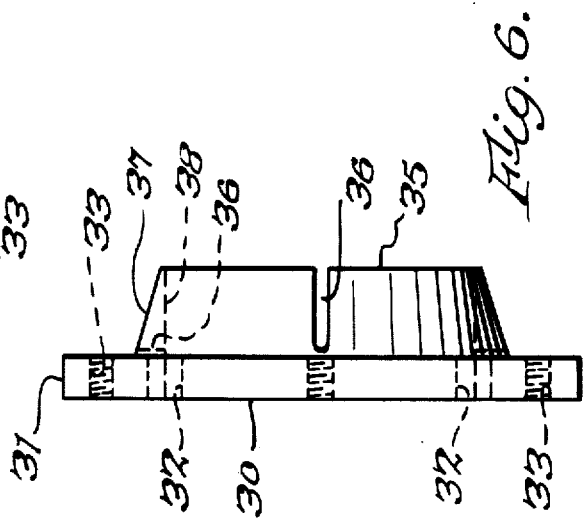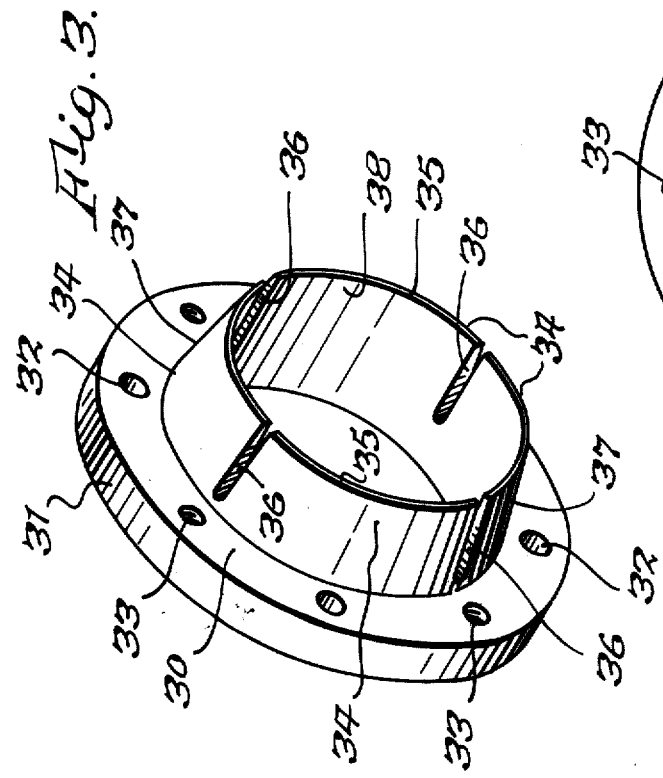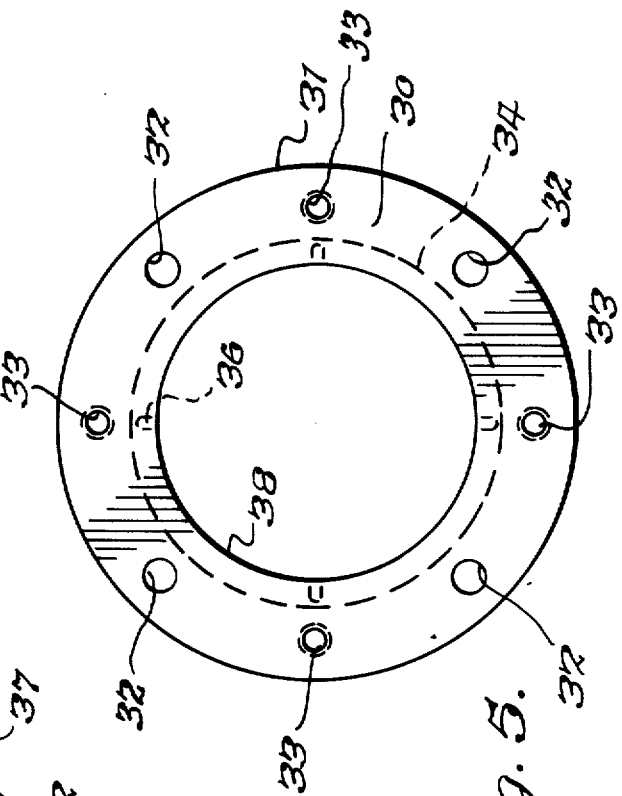

HUB-TO-SHAFT CONNECTION

The present invention relates to an improved hub-to-shaft mounting. By way of background, it is well known to use a tapered member between a tapered hub and a shaft to mount the hub on the shaft with a wedge fit. However, in the past the tapered member was generally keyed to the shaft and the hub was secured to the tapered member. Because of this construction the screws which usually were connected between the tapered member and the hub were subjected to shear forces during rotation. In addition, the tapered members had to be sufficiently thick so that they could receive a key mounted on the shaft, and therefore they were not sufficiently flexible so as to conform precisely to the space between the hub and the shaft to thereby provide a good tight fit. In addition, prior tapered members located between a hub and a shaft generally could not flex uniformly around the shaft and therefore could not mount the hub in substantially perfectly centered relationship to the axis of the shaft. It is with an improved hub-to-shaft connection which overcomes the foregoing difficiencies of the prior art that the present invention is concerned.

It is accordingly one important object of the present invention to provide an improved hub-to-shaft connection in which the torsional loading is transmitted directly between the shaft and the hub so as to obviate any shear loading on any of the other members which are used to mount the hub on the shaft.

Another object of the present invention is to provide an improved hub-to-shaft connection which is of such a nature that it provides a good tight mounting and which also maintains the hub in substantially perfectly centered relationship relative to the axis of the shaft.

A further object of the present invention is to provide an improved hub-to-shaft connection utilizing a flexible intermediate member which can conform substantially exactly to the space between the hub and the shaft to thereby provide a good tight fit therebetween.

A still further object of the present invention is to provide an improved hub-to-shaft connection which can be assembled and disassembled simply without specialized tools and which will provide a tight fit which is equivalent to that obtainable heretofore only with an interference fit.

The improved hub-to-shaft connection of the present invention comprises a shaft, a hub, key means located directly between said hub and said shaft to carry the torsional loading therebetween, a tapered surface on said hub, tapered wedge means for placement between said tapered surface and said shaft, and wedge-moving means for moving said tapered wedge means into tight engagement between said tapered surface and said shaft to securely mount said hub on said shaft. In accordance with another aspect of the present invention, the tapered wedge means comprise a collar with flexible leaves which can conform to the space between the hub and the shaft. In accordance with still another aspect of the present invention, a pair of collars each having flexible leaves are located at opposite ends of the hub, between the hub and the shaft, so as to mount the hub in perfectly square centered relationship relative to the shaft.

The various aspects of the present invention will be more fully understood when the following portions of the specification are read in conjunction with the accompanying drawings wherein:

FIG. 1 is a fragmentary cross sectional view of the improved hub-to-shaft connection of the present invention taken substantially along line 1—1 of FIG. 2;

FIG. 2 is a fragmentary cross sectional view taken substantially along line 2—2 of FIG. 1;

FIG. 3 is a perspective view of the collar having flexible tapered leaves circumferentially mounted thereon;

FIG. 4 is an end elevational view taken from the right of FIG. 3;

FIG. 5 is an end elevational view taken from the left of FIG. 3; and

FIG. 6 is a side elevational view of the collar of FIG. 3.

The improved hub-to-shaft connection 10 of the present invention includes a shaft 11 having a hub 12 of a fan or the like mounted thereon by the improved mounting construction of the present invention. As mentioned briefly above, in fans of large diameter, especially those which are subjected to a large variation in temperature and/or high speed, the hub must be mounted securely on the shaft by an interference fit, otherwise the hub will become loose on the shaft. Furthermore, in fans of a large diameter the hub must be centered very accurately on the shaft in order to avoid off-balance operation.

The improved hub-to-shaft mounting 10 of the present invention achieves the foregoing objectives. In this respect, hub 12 is of annular configuration and includes first and second substantially annular tapered surfaces 13 and 14 at opposite ends thereof. Surfaces 13 and 14 are facing in opposite directions, as can be seen from FIG. 1. Surfaces 13 and 14 extend for a full 360° within the hub except at their lower ends they are partially separated by a keyway 15 which extends from front surface 16 of the hub to rear surface 17 thereof. However, tapered portions 13' and 14' are located in the keyway so that substantially 360° of the hub is engaged by the wedge members described hereafter.

A keyway 18 in central portion 19 of shaft 11 receives a key 20 therein, and key 20 is held in position by screw 21. The hub 12, during installation, is slid over installed key 20, which is received in slot 15 of the hub with sides 22 of key 20 being in close engagement with sides 23 of slot 15 so as to provide extremely little play, whereby key 20 will carry the entire torsional loading between the hub 12 and shaft 11, whereby such loading will then not be transferred to the screws 24, which are also used in the improved connection of the present invention in a manner to be described hereafter.

After hub 12 has been moved to the position shown in FIG. 1, a set screw 26, which is located in tapped bore 27, is tightened to initially stabilize hub 12. A second set screw 28 is placed in series with the first set screw to lock it in place. However, the second set screw 28 is preferably inserted after the rest of the installation has been completed.

In order to mount hub 12 on shaft 11 with a wedge fit which is the equivalent of an interference fit, collars 30 are used. Each collar 30 includes an annular ring portion 31 having a plurality of untapped bores 32 alternating with a plurality of tapped bores 33. The untapped bores 32 are spaced 90° from each other and the tapped bores 33 are also spaced 90° from each other and each tapped bore is located centrally between adjacent untapped bores. A plurality of flexible tapered leaves 34 in the nature of wedges have their thicker ends securely attached to the inner portion of ring 31 and their outer ends 35 are free. Preferably collar 30 is a unitary machined item. Adjacent flexible leaves 34 are separated by slots 36 which permit the leaves 34 to deflect during the axial movement of the collars during tightening of the bolts. Each leaf 34 has an outer sloping surface 37 which is of the same slope as surfaces 13—13' and 14—14' with which surfaces 37 are in engagement as shown in FIG. 1. The inner surfaces 38 of leaves 34 are essentially of cylindrical curvature so as to provide good engagement with the outer cylindrical surface of shaft portion 19.

In order to securely mount hub 12 on shaft 11 after it has been positioned over key 20, collars 30 are positioned at opposite ends of hub 12 and on opposite sides of key 20 in the manner shown in FIG. 1 with leaves 34 in light wedging engagement between the outer cylindrical surface of the shaft and tapered surfaces 13—13' and 14—14' of the hub. As noted above, tapered surfaces 13 plus 13' cover 360° of the hub. The same is true of tapered surfaces 14 plus 14'. Therefore there is substantially a total 360° contact between the tapered surfaces of the collars 30 and the tapered surfaces of the hub to provide good centering of the hub on the shaft. Thereafter, cap screws 24 are inserted through untapped apertures 32 in each of the collars 30 and are threaded by hand into the tapped bores 40 in hub 12, it being appreciated that each side of the hub has four tapped bores 40 therein to correspond to the four bores 32 in collar 30. Thereafter, the cap screws 24 are tightened with a wrench, and in this respect alternate cap screws are tightened in sequence and both collars are tightened at the same time. By this procedure the hub 12 will remain true relative to the shaft 11, that is, it will not tend to cock. It will be appreciated that the tightening of cap screws 24 will cause leaves 34 to move into an extremely tight wedging engagement between the hub and the shaft to provide the equivalent of an interference fit. It will also be appreciated, as noted above, that the entire torsional loading is carried by key 20 and therefore screws 24 are not loaded in shear. Furthermore, because leaves 34 of the several collars 30 lie on opposite sides of key 20 so as not to contact it, the key 20 will not interfere with uniform flexing of all of the leaves of each collar to provide a good centering action of the hub on the shaft.

After cap screws 24 have been tightened to the desired degree, lock wires 42 are inserted through the holes in the heads of the cap screws and the ends of the lock wires are tack-welded into place to thereby insure that the cap screws do not loosen in operation.

When it is desired to remove hub 12 from shaft 11, it is merely necessary to unthread screws 24 after the lock wires have been unfastened. Thereafter, the cap screws 24 are threaded into tapped apertures 33 so that the ends of cap screws 24 bear against the side surfaces 16 and 17 of the hub. It will be appreciated that the tightening of screws 24 in threaded apertures 33 will cause the collars 30 to back off from their wedged position so that they can be removed from shaft 11. Thereafter, set screws 26 and 28 are loosened and the hub 12 may be slid off of shaft 11.

Collar 30 may be fabricated from mild steel or it may be made from any other alloy which can function properly. In addition, collar 30 may be of any desired size to fit on assemblies having shafts from approximately one inch to thirty or more inches in diameter.

It can thus be seen that the improved hub-to-shaft connection of the present invention is manifestly capable of achieving the above objects and while a preferred embodiment of the present invention has been disclosed, it will be appreciated that it is not limited thereto but may be otherwise embodied within the scope of the following claims.

What is claimed is:

1. A hub-to-shaft connection comprising a hub, a shaft, a tapered surface on said hub, a collar having a plurality of tapered flexible leaf means circumferentially spaced thereon, and moving means for effecting relative axial movement between said tapered surface on said hub and said tapered leaf means in engagement therewith so as to effect a tight locking engagement between said hub and said shaft; a second tapered surface on said hub spaced from and extending in the opposite direction from said tapered surface, a second collar having a plurality of second tapered flexible leaf means circumferentially spaced thereon, and second wedge-moving means for effecting relative axial movement between said second tapered surface on said hub and said second tapered leaf means in engagement therewith so as to effect a tight locking engagement between said hub and said shaft at the location of said second leaf means, key means positioned directly between and engaging both said hub and said shaft, said key means being axially spaced on said hub from said leaf means so as to permit substantially 360° engagement between said leaf means and said hub, screw means for securing said key means to said shaft, and set screw means for securing said hub to said shaft in a predetermined axial position prior to effecting said tight locking engagement between said hub and said shaft.

* * * * *